US012790011B2

(12) United States Patent
Chang

(10) Patent No.: US 12,790,011 B2
(45) Date of Patent: Nov. 10, 2026

(54) AIRCRAFT EQUIPPED WITH FUEL CELL SYSTEM

(71) Applicants: Hyundai Motor Company, Seoul (KR); Kia Corporation, Seoul (KR)

(72) Inventor: Byung Wook Chang, Incheon (KR)

(73) Assignee: Hyundai Motor Company ; Kia Corporation, Seoul (KR)

( * ) Notice: Subject to any disclaimer, the term of this patent is extended or adjusted under 35 U.S.C. 154(b) by 81 days.

(21) Appl. No.: 18/146,945

(22) Filed: Dec. 27, 2022

(65) Prior Publication Data

US 2024/0025551 A1 Jan. 25, 2024

(30) Foreign Application Priority Data

Jul. 21, 2022 (KR) ........................ 10-2022-0090454

(51) Int. Cl.
*B64D 27/357* (2024.01)
*B64D 13/06* (2006.01)
(Continued)

(52) U.S. Cl.
CPC ........... *B64D 27/357* (2024.01); *B64D 13/06* (2013.01); *B64D 27/34* (2024.01); *B64D 27/355* (2024.01);
(Continued)

(58) Field of Classification Search
CPC ........ B64D 27/24; B64D 13/06; B64D 37/04; B64D 27/026; H01M 8/04014; H01M 8/04753; H01M 8/0494; H01M 8/04932
(Continued)

(56) References Cited

U.S. PATENT DOCUMENTS

| | | | | |
|---|---|---|---|---|
| 4,746,081 | A | 5/1988 | Mazzoni | |
| 8,657,227 | B1 * | 2/2014 | Bayliss | B64D 13/00 244/58 |
| 11,993,391 | B1 * | 5/2024 | Piasecki | B64D 37/30 |
| 2005/0199766 | A1 * | 9/2005 | Knott | B64D 27/351 244/55 |

(Continued)

FOREIGN PATENT DOCUMENTS

| | | | | |
|---|---|---|---|---|
| JP | 2002070580 A | | 3/2002 | |
| JP | 2006099988 A | * | 4/2006 | Y02E 60/10 |

(Continued)

OTHER PUBLICATIONS

Alexander, Weight & Balance: Weighing and Measuring Your Safety, 2001, EAA Sport Aviation, pp. 2-5 (Year: 2001).*

*Primary Examiner* — Haroon S. Sheikh
*Assistant Examiner* — John S Medley
(74) *Attorney, Agent, or Firm* — Banner & Witcoff, Ltd.

(57) ABSTRACT

The present disclosure relates to a fuel cell system and an aircraft equipped with a fuel cell system. The aircraft may have a fuselage elongated in a front-rear direction, a front horizontal stabilizer towards a front of the fuselage, main wings extending to opposite sides of the fuselage, a rear horizontal stabilizer towards a rear of the fuselage, the fuel cell system rear to the main wings and a controller. The fuel cell system may be configured to provide electrical energy for driving a motor on each of the main wings. The controller may be configured to cause transmission of electrical energy from the fuel cell system to the motor. A center of gravity of the aircraft may be near front edges of the main wings. A flow rate of air into the fuel cell system may be controlled in response to an outside air condition.

19 Claims, 9 Drawing Sheets

(51) Int. Cl.

| | |
|---|---|
| ***B64D 27/34*** | (2024.01) |
| ***B64D 27/355*** | (2024.01) |
| ***B64D 37/04*** | (2006.01) |
| ***H01M 8/04014*** | (2016.01) |
| ***H01M 8/04082*** | (2016.01) |
| ***H01M 8/04746*** | (2016.01) |
| ***H01M 8/04858*** | (2016.01) |
| *B64D 27/02* | (2006.01) |
| *B64D 27/31* | (2024.01) |

(52) U.S. Cl.
CPC ........ *B64D 37/04* (2013.01); *H01M 8/04014* (2013.01); *H01M 8/04201* (2013.01); *H01M 8/04753* (2013.01); *H01M 8/0494* (2013.01); *B64D 2013/0644* (2013.01); *B64D 27/026* (2024.01); *B64D 27/31* (2024.01); *H01M 2250/20* (2013.01)

(58) Field of Classification Search
USPC .......................................................... 429/443
See application file for complete search history.

(56) References Cited

U.S. PATENT DOCUMENTS

| | | | | |
|---|---|---|---|---|
| 2008/0001026 | A1 | 1/2008 | Hoffjann et al. | |
| 2015/0151844 | A1* | 6/2015 | Anton .................. | B64D 35/023 903/903 |
| 2016/0087288 | A1* | 3/2016 | Maslyn ............. | H01M 8/04559 429/410 |
| 2018/0134401 | A1* | 5/2018 | Halsey ................... | B64D 27/31 |
| 2020/0388865 | A1* | 12/2020 | Rainville .......... | H01M 8/04014 |
| 2021/0020974 | A1* | 1/2021 | Ballantine .............. | B01D 53/62 |
| 2021/0391627 | A1* | 12/2021 | Villanueva .......... | H01M 10/625 |
| 2023/0348081 | A1* | 11/2023 | Riediger ................ | B64D 27/12 |
| 2023/0382552 | A1* | 11/2023 | Wang ................ | H01M 8/04298 |

FOREIGN PATENT DOCUMENTS

| | | | | |
|---|---|---|---|---|
| JP | 2017081559 A | 5/2017 | | |
| KR | 101660652 B1 | 9/2016 | | |
| KR | 10-2020-0025861 A | 3/2020 | | |
| WO | WO-2022073543 A1 * | 4/2022 | ........... | B64D 27/355 |
| WO | WO-2023223119 A1 * | 11/2023 | ........... | B64C 1/0009 |

* cited by examiner

AIRCRAFT EQUIPPED WITH FUEL CELL SYSTEM

CROSS-REFERENCE TO RELATED APPLICATION

This application claims, under 35 U.S.C. § 119(a), the benefit of and priority from Korean Patent Application No. 10-2022-0090454 filed on Jul. 21, 2022, the entire contents of which are incorporated herein by reference.

BACKGROUND

An aircraft may require fuel to fly. For example, an engine of an aircraft may require jet fuel to run and provide a propulsion force to the aircraft. However, fuel to fly an aircraft may be expensive and/or environmentally harmful. Aircrafts that can operate with reduced fuel consumption and/or increased fuel energy conversion efficiency may be desired.

A fuel cell system may be classified according to a type of electrolyte used (e.g., a phosphoric acid fuel cell (PAFC), a molten carbonate fuel cell (MCFC), a solid oxide fuel cell (SOFC), a polymer electrolyte membrane fuel cell (PEMFC), an alkaline fuel cell (AFC), a direct methanol fuel cell (DMFC), etc.). Fuel cell systems may be used in various application fields such as mobile power supply, transportation, and distributed power generation. Different classes of fuel cell systems may be selected for applications depending, for example, on the operating temperature, output range, etc. Polymer electrolyte fuel cells, for example, have been applied to the aircraft field, and have been developed to replace aircraft internal combustion engines.

Electricity may be generated through a chemical reaction (e.g., a redox reaction) between hydrogen and oxygen, or another oxidizing agent. A fuel cell system may comprise a fuel cell stack for generating electrical energy, a fuel supply device that supplies fuel (e.g., hydrogen) to the fuel cell stack, and an supply device that supplies oxygen (e.g. an air supply device).

As such, if the fuel cell system were to be employed as a driving system of the aircraft, there may be the following limitations. The aircraft would have to carry the fuel cell stack, the fuel supply, the oxygen supply device, one or more means for draining water generated from the redox reaction, a high-voltage battery configured to store electricity produced by the fuel cell system, a controller that converts and controls the electricity produced, a motor that generates driving force, etc. Carrying the fuel cell system may increase a weight of, and/or cause a change in a center of gravity of, the aircraft, e.g., relative to a cabin located inside a fuselage of the aircraft. Also, or alternatively, the weight and/or the center of gravity of the aircraft may be affected by a positional relation of the hydrogen storage tank for supplying hydrogen and a layout of equipment for transmitting electrical energy generated by the fuel cell stack to one or more motors (e.g., in nacelles located on a main wing).

Also, or alternatively, it may be desired to determine an efficient/effective layout of an inlet through which air flowing into the fuel cell system may flow for setting the amount of compressed air that may be transmitted to the fuel cell stack using the same.

SUMMARY

The following summary presents a simplified summary of certain features. The summary is not an extensive overview and is not intended to identify key or critical elements.

Systems, apparatuses, and methods may be described for a fuel cell system and an aircraft equipped with the fuel cell system. The fuel cell system may comprise an inlet portion configured to cause outside air to be introduced to the fuel cell system, a blower located adjacent to the inlet portion, a fuel cell stack connected to the inlet portion, an air recirculation loop formed between the inlet portion and a discharge portion of the fuel cell stack configured to cause air to be discharged from the fuel cell stack, a hydrogen storage tank connected to the fuel cell stack; and a controller to control a flow rate of air into the fuel cell system in response to a determined outside air condition.

An aircraft may comprise a fuselage, a first horizontal stabilizer located towards a first end of the fuselage, a second horizontal stabilizer located towards a second end of the fuselage, main wings located to extend from opposite sides of the fuselage at a position between the first end and the second end of the fuselage, a fuel cell system configured to generate electrical energy and supply the electrical energy to an electrical motor configured to drive a propeller of the aircraft, and a controller configured to cause transmission of the electrical energy to the driving device, and to control a flow rate of air into the fuel cell system in response to a determined outside air condition of air outside the aircraft.

The above and other features of the disclosure may be described in greater detail below.

BRIEF DESCRIPTION OF THE DRAWINGS

The above and other features of the present disclosure will now be described in detail with reference to certain examples thereof shown in the accompanying drawings. The examples may be given below by way of illustration only, and may be not limitative of the present disclosure.

Figure 1:
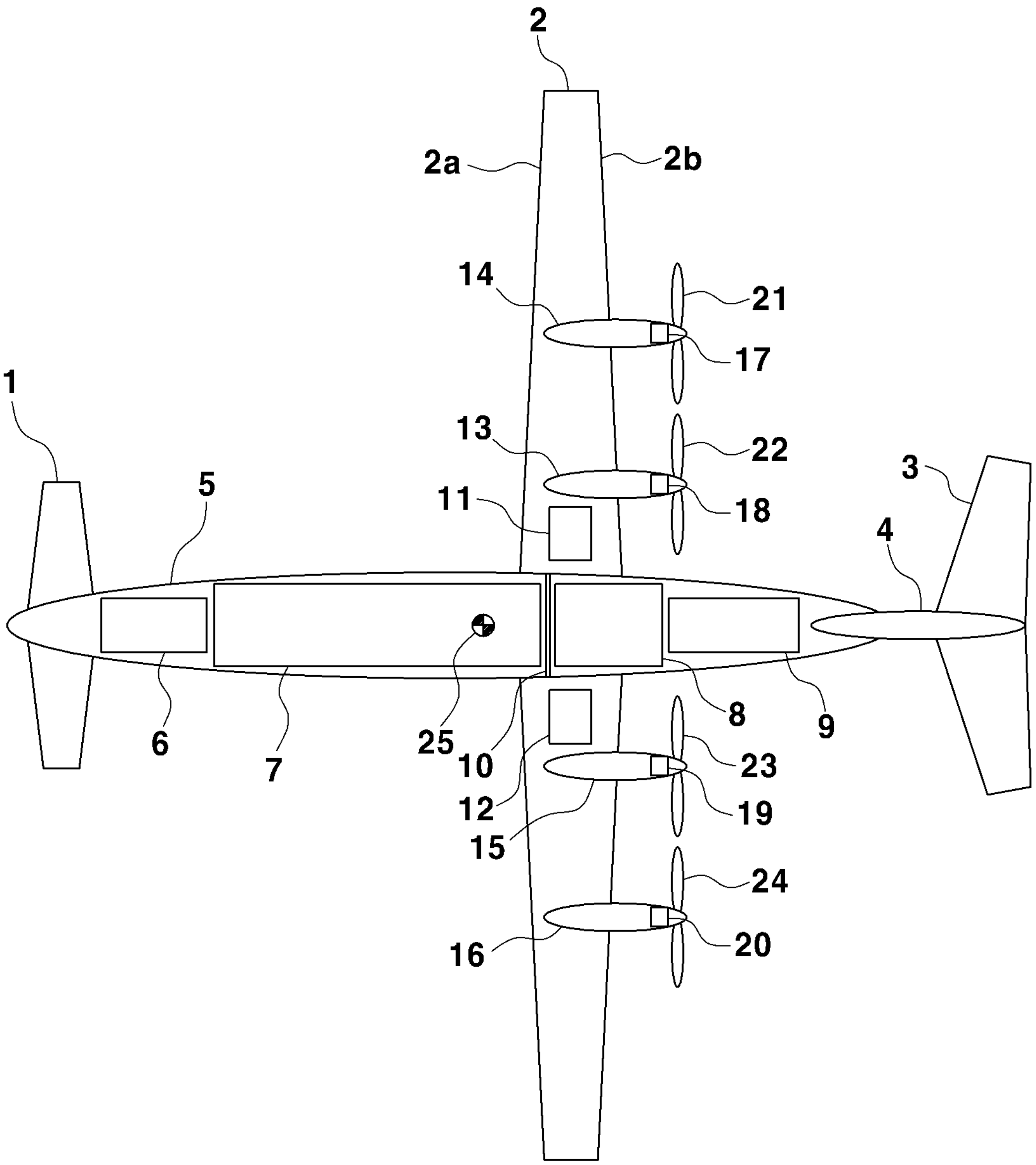
FIG. 1 is a top plan view illustrating a layout of a fuel cell system of an aircraft fuselage as an example of the present disclosure.

The drawings may be not necessarily to scale, and may present a simplified representation of various features illustrative of the basic principles of the disclosure. The specific design features as disclosed herein, comprising, for example, specific dimensions, orientations, locations, and shapes may be determined in part by the particular intended application and use environment.

In the figures, reference numbers refer to the same or equivalent parts of the present disclosure throughout the figures.

DETAILED DESCRIPTION

Hereinafter, examples of the present disclosure will be described in more detail with reference to the accompanying drawings so as to clearly explain the present disclosure to those of ordinary skill in the art. The examples of the present disclosure may be modified in various forms, and the scope of the present disclosure should not be construed as being limited to the following examples Terms such as "... unit", "... system", "... cell", etc. as used herein refer to a unit/system/cell configure to perform a function or operation, which may be implemented by hardware, software, and/or a combination of hardware and software.

Also, or alternatively, a "set value" described in the specification is an arbitrary numerical value stored in a controller 8*e*, which may be determined according to a use environment.

Also, or alternatively, the terms used in the specification may be used only to describe specific examples, and may be not intended to limit the examples. Expressions in the singular should also be interpreted to comprise expressions in the plural, unless the context clearly indicates otherwise.

Also, or alternatively, an orientation of a configuration is referred to herein as "front" or "rear" based on a direction in which an aircraft may be configured to fly.

Hereinafter, the examples will be described in detail with reference to the accompanying drawings, and the same or corresponding components may be will be given the same reference numerals, and overlapping description thereof will be omitted.

An aircraft may be equipped with a fuel cell system 8. The fuel cell system 8 may have a layout relative to a fuselage 5 of the aircraft, such that the fuel cell system 8 may be located to a rear end of the cabin 7. The aircraft may also have a plurality of nacelles, such as nacelles 13, 14, 15, and 16, which may be located on main wings 2, which may extend from sides of the aircraft.

FIG. 1 shows an example of a location of the fuel cell system 8 relative to the fuselage 5 of the aircraft, and a center of gravity 25 of the aircraft fuselage 5 equipped with the fuel cell system 8.

The aircraft may comprise the fuselage 5. The fuselage may be elongated to have a longitudinal direction, and may comprise a front horizontal stabilizer 1 located at a front end of the fuselage 5, a rear horizontal stabilizer 3 located at a rear end of the fuselage 5, and the main wings 2 located extending from sides of a point between the front end and the rear end (e.g., approximately at a longitudinal center of the fuselage 5). A vertical stabilizer 4 may be provided vertical to the rear horizontal stabilizer 3. The vertical stabilizer 4 may be controllable to be rotatable in a left and right rotation in a longitudinal direction of the fuselage 5.

A cockpit 6 of the aircraft may be located at one front end of the fuselage 5, and an area for the cabin 7 located adjacent to the cockpit 6 may be provided. The area may be used in a variety of ways, e.g., to carry passengers and/or loads.

Also, or alternatively, the fuel cell system 8 may be located (e.g., a collective center of gravity of the fuel cell system 8 may be located) rear to the main wings 2 (and/or rear to a longitudinal center of the fuselage 5). The fuel cell system 8 may be configured to apply a driving force via a driving device (e.g., an electrical motor configured to drive a propeller) associated with (e.g., housed in and/or supported by) the nacelles 13, 14, 15, and 16 located on the main wings 2.

At least one of the nacelles 13, 14, 15, and 16 may be provided on each of the main wings 2, which may extend to opposite sides of the fuselage 5. In one example of the present disclosure, two of the nacelles 13, 14, 15, and 16 may be provided on a main wing 2 located on one side of the fuselage, and two others of the nacelles 13, 14, 15, and 16 may be provided on another of the main wings 2. Each wing of the aircraft may be provided with a same number of nacelles (e.g., the nacelles 13, 14, 15, and 16).

Furthermore, the nacelles 13, 14, 15, and 16 may comprise (e.g., house and/or support) propellers 21, 22, 23, and 24, and/or auxiliary electric propulsion units (EPUs) 17, 18, 19, and 20, which may be configured for transmitting electrical energy applied from the fuel cell system 8 to the propellers 21, 22, 23, and 24.

That is, electrical energy generated from the fuel cell system 8 may be usable to create a rotational force for the propellers 21, 22, 23, and 24 (e.g., via the EPUs 17, 18, 19, and 20). The propellers 21, 22, 23, and 24 may be configured to convert the rotational force into a propulsion force for the aircraft. The propellers 21, 22, 23, and 24 may be positioned on the main wings 2, e.g., on an edge towards the rear of the aircraft. The auxiliary EPUs 17, 18, 19, and 20 may be positioned inside nacelle 13, 14, 15, and 16.

Also, or alternatively, as an example of the present disclosure, the center of gravity 25 of the aircraft may be configured to be located in the fuselage 5 close to (e.g., approximately in line with) front ends of the main wings 2. The center of gravity 25 may be located in front of a center of the fuselage 5 comprising the main wings 2 with respect to the fuselage 5 of the aircraft. The fuel cell system may be positioned relative to the fuselage 5 such that the center of gravity 25 may be formed at a location towards a rear end of the cabin 7.

A firewall 10 may be provided between the cabin 7 and the fuel cell system 8. The fuselage 5, in which the fuel cell system 8 may be mounted, and the cabin 7 may therefore be safely separated from each other.

A hydrogen storage tank 9 may be configured to be able to supply hydrogen to a fuel cell stack 8*d*. The fuel cell stack 8*d* may be provided towards a rear end of the fuel cell system 8. The hydrogen storage tank 9 may be configured to be located at one end close to a tail of the fuselage 5.

Also, or alternatively, the present disclosure may comprise high-voltage batteries 11 and 12, which may be located on (e.g., within and/or attached to) the main wings 2. The high-voltage batteries 11 and 12 may be configured to conduct electricity, in addition or alternatively to the fuel cell stack 8*d*. The high-voltage batteries 11 and 12 may be configured to be chargeable by the fuel cell stack 8*d*. The high-voltage batteries 11 and 12 may be configured to transmit electrical energy to the nacelles 13, 14, 15 and 16. That is, the controller 8*e* of the fuel cell system 8 may be configured to drive the driving devices associated with the nacelles 13, 14, 15 and 16 using the electrical energy generated from the fuel cell stack 8*d*. The high voltage batteries may supplement and/or replace the fuel cell stack 8*d* in providing electrical energy to create the driving force of the driving devices of the nacelles 13, 14, 15 and 16 (e.g., when additional electrical energy is required/desired). Furthermore, the controller 8*e* may be configured to recharge the high-voltage batteries 11 and 12 through the fuel cell stack 8*d* (e.g., when the charge amount of the high-voltage batteries 11 and 12 is less than or equal to a set value).

Moreover, the high-voltage batteries 11 and 12 of the present disclosure may be provided adjacent to the nacelles 13, 14, 15, and 16. The fuel cell system 8 may be positioned adjacent to where the main wings 2 may be extend from to the fuselage. These relative positions and/or locations may reduce and/or minimize the length of cables for conducting electricity between the nacelles 13, 14, 15, and 16, the high-voltage batteries 11 and 12, and/or the fuel cell system 8.

Figure 2:
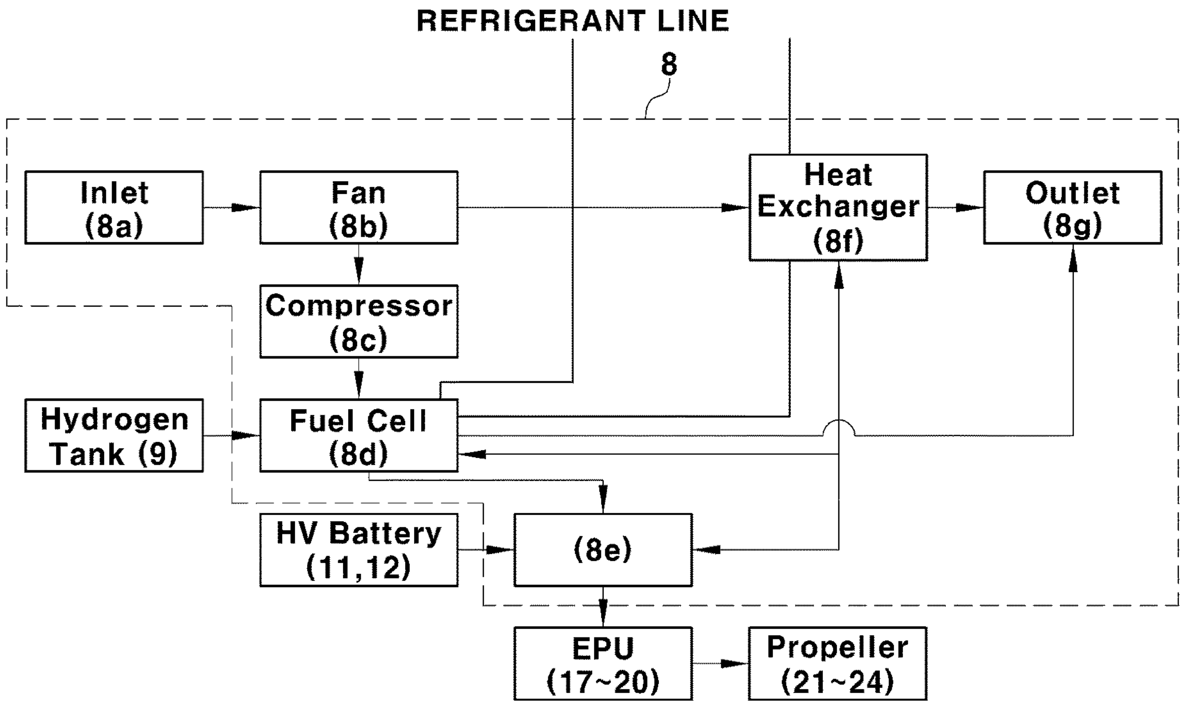
FIG. 2 is a block diagram illustrating a coupling relationship of the fuel cell system as an example of the present disclosure.

FIG. 2 shows a block diagram illustrating a connection relationship of the fuel cell system 8, the high-voltage batteries 11 and 12, the hydrogen tank 9, the EPUs 17, 18, 19, and 20, and the propellers 21, 22, 23 and 24. The hydrogen storage tank 9 may comprise a hydrogen detection sensor (not shown), and/or may measure an amount of hydrogen in the hydrogen storage tank 9 (e.g., in real time) The hydrogen tank 9 may comprise a manifold connected (e.g., fluid-connected) to the fuel cell stack 8*d*. Hydrogen may be exhausted through the manifold. Also, or alternatively, the hydrogen storage tank 9 may comprise a hydrogen receptacle (not shown). The hydrogen receptacle may allow for hydrogen to be injected from outside of the fuselage 5 and/or outside of the hydrogen storage tank 9. The manifold of the hydrogen storage tank 9 may comprise a pressure relief valve and/or a regulator for performing pressure relief.

Hydrogen stored in the hydrogen storage tank 9 may be able to be introduced into the fuel cell stack 8*d*, and electrical energy may be generated via the fuel cell stack 8*d*.

The fuel cell system 8 may comprise an inlet portion 8*a* configured to introduce outside air. The inlet portion 8*a* may be formed at a position configured to be near an upper side of the fuselage 5. The inlet portion 8*a* may be configured to allow outside air to flow into the fuel cell system 8 when the aircraft is propelled forward. The inlet portion 8*a* may be configured so that outside air and hydrogen may be introduced into the fuel cell stack 8*d*, so as to be able to generate electrical energy through a reaction (e.g., a redox reaction). Hydrogen, air, and reaction water discharged from the fuel cell stack 8*d* may be discharged to the outside of the fuselage 5 through an outlet of the fuel cell system 8.

Furthermore, the controller 8*e* may be configured to transmit and/or cause transmission of electrical energy generated by the fuel cell stack 8*d* to the driving devices associated with the nacelles 13, 14, 15, and 16. The controller 8*e* may be configured to provide electrical energy generated in communication with the auxiliary EPUs 17, 18, 19, and 20 to the nacelles 13, 14, 15, and 16 and/or the high-voltage batteries 11 and 12. Also, or alternatively, the controller 8*e* may be configured to control a flow rate of hydrogen and/or oxygen (e.g., air) flowing into the fuel cell stack 8*d* (e.g., in response to a thrust request).

Moreover, the controller 8*e* may control rotational force of a blower 8*b* located at a rear end of the inlet portion 8*a* based on a cruising speed of the aircraft, external air density (e.g., according to altitude and/or according to temperature. Also, or alternatively, the controller 8*e* may be configured to control the driving amount of a recirculation blower 31 for driving an air recirculation loop 30 according to the oxygen density at a discharge end of the fuel cell stack 8*d*.

The controller 8*e* and the auxiliary EPUs 17, 18, 19, and 20 may be configured to set the driving amount of the fuel cell system 8 and/or energy consumption of the driving devices associated with the nacelles 13, 14, 15, and 16 in response to a request from a driving device. Also, or alternatively, the controller 8*e* may be configured to measure the charge amount of the high-voltage batteries 11 and 12, and/or charge the high-voltage batteries 11 and 12 through the fuel cell stack 8*d* (e.g., when the measured charge amount is less than or equal to a set value).

Also, or alternatively, the controller 8*e* may be configured to drive the fuel cell stack 8*d* to generate electrical energy in response to an electrical energy request from the auxiliary EPUs 17, 18, 19, and 20 located on the nacelles 13, 14, 15, and 16, and/or to cause additional electrical energy to be provided to the nacelles 13, 14, 15, and 16 via the high-voltage batteries 11 and 12.

As such, the high-voltage batteries 11 and 12 may maintain a constant state of charge to be able to back up driving of the fuel cell stack 8*d*.

The fuel cell stack 8*d* may be configured to introduce outside air through the inlet portion 8*a*, and may comprise the blower 8*b* positioned rear to the inlet and/or a compressor positioned rear to the blower 8*b*. The compressor may be configured to compress inlet gas (air) sucked into the fuel cell system and supply the inlet gas to the fuel cell stack 8*d*.

Also, or alternatively, air branched from the blower 8*b* may be introduced into a heat exchanger 8*f*, and may be connected to a refrigerant loop circulating through the heat exchanger 8*f* and the fuel cell stack 8*d*. Accordingly, a reaction temperature inside the fuel cell stack 8*d* may be set.

The fuel cell stack 8*d* may be formed in various structures capable of generating electricity through a redox reaction between a fuel (for example, hydrogen) and an oxidizing agent (for example, air).

For example, the fuel cell stack 8*d* may comprise a membrane electrode assembly (MEA) (not shown) having catalyst electrode layers where electrochemical reactions occur attached to both sides of an electrolyte membrane through which hydrogen ions move, a gas diffusion layer (GDL) (not shown) that evenly distributes reactive gases and transfers generated electrical energy, a gasket and a fastener (not shown) for maintaining airtightness and proper clamping pressure of the reaction gases and cooling water, and a bipolar plate (not shown) for moving the reactive gases and cooling water.

In the fuel cell stack 8*d*, hydrogen serving as a fuel and air (oxygen) serving as an oxidizing agent may be respectively supplied to an anode and a cathode of a membrane electrode assembly through a flow path of the bipolar plate, hydrogen may be supplied to the anode, and air may be supplied to the cathode.

Hydrogen supplied to the anode may be decomposed into hydrogen ions (protons) and electrons by a catalyst of electrode layers on both sides of the electrolyte membrane. Of the hydrogen ions and the electrons, only the hydrogen ions may be selectively transferred to the cathode through the electrolyte membrane, which may be a cation exchange membrane. At the same time, the electrons may be transferred to the cathode through the gas diffusion layer and the bipolar plate, which may be conductors.

At the cathode, the hydrogen ions supplied through the electrolyte membrane and the electrons transferred through the bipolar plate meet with oxygen in the air supplied to the cathode by an air supply device to generate water. A flow of electrons through an external conductor may be generated due to movement of hydrogen ions, and a current may be generated by the flow of these electrons.

Electrical energy may be generated through the flow of the electrons generated in this way, thereby applying driving force to the nacelles 13, 14, 15, and 16. The propulsion force of the aircraft may be generated by rotating the propellers 21, 22, 23, and 24 located on the nacelles 13, 14, 15, and 16.

Water and air generated as by-products reacted in the fuel cell stack 8*d* may be discharged to the outside of the fuselage 5 through a discharge portion 8*g*.

Figure 3:
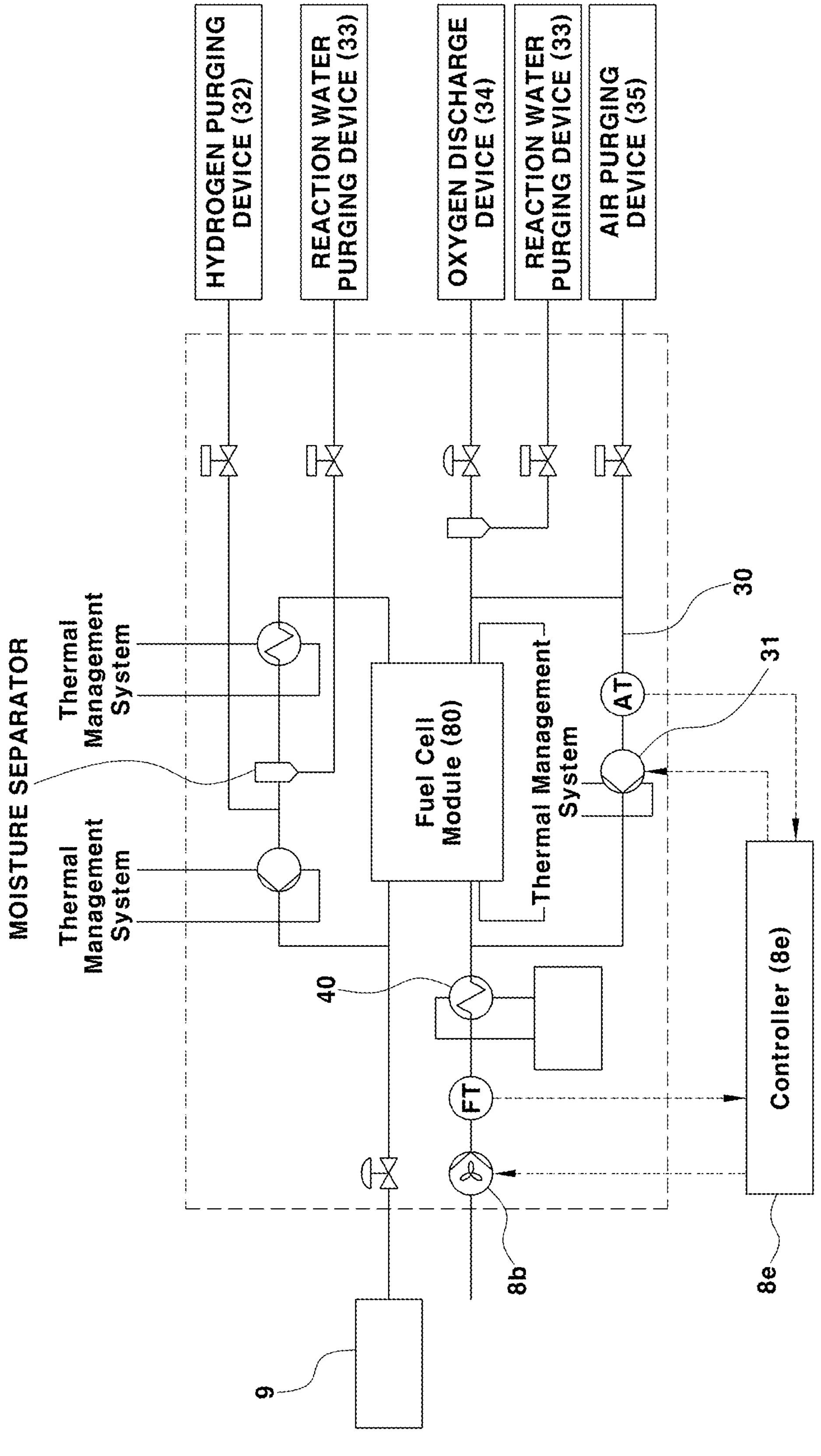
FIG. 3 shows a flow loop of a fuel cell stack as an example of the present disclosure.

FIG. 3 shows a connection relationship between the fuel cell stack 8*d*, and an air flow rate control loop and the air recirculation loop 30 coupled to the fuel cell stack 8*d* as an example of the present disclosure.

The inlet portion 8*a* of the fuel cell system 8 of the present disclosure may be located adjacent to the upper end of the fuselage 5, and at least a part of the outside air flowing along the upper end of the fuselage 5 may be introduced into the fuel cell system 8.

Moreover, the controller 8*e* may be configured to calculate the oxygen concentration and humidity of the outside air introduced through a sensor unit (not shown), and to drive the blower 8*b* and the compressor according to the calculated oxygen concentration and humidity. Also, or alternatively, the controller 8*e* may be configured to perform driving of the heat exchanger 8*f* by determining the outside air temperature of the aircraft, and may be configured to set a temperature of a refrigerant flowing through the fuel cell stack 8*d*.

The fuel cell stack 8*d* may be configured so that oxygen in the air may be supplied through an inlet end, and may comprise the blower 8*b* positioned at the rear end of the inlet portion 8*a* and a humidifier positioned at the rear end of the blower 8*b*. Accordingly, the flow rate of the air flowing into the fuel cell system 8 along the inlet portion 8*a* may be controlled by the blower 8*b*, and furthermore, the humidity may be controlled through the humidifier. More preferably, a flow meter may be comprised between the blower 8*b* and the humidifier to measure the flow rate of the air introduced into the fuel cell system 8. That is, the controller 8*e* may control humidification and the flow rate of the air introduced into the fuel cell stack 8*d*, and may be configured to be able to control the driving amount of the blower 8*b* in response to an outside air condition.

Furthermore, an oxygen discharge device 34 capable of discharging residual oxygen after the reaction of the fuel cell stack 8*d* and a reaction water purging device 33 configured to discharge reaction water may be connected. Also, or alternatively, a recirculation loop connected from the air discharge end of the fuel cell stack 8*d* to an inlet end of the fuel cell stack 8*d* may be comprised, and the controller 8*e* may set circulation so that the air from the discharge end of the fuel cell stack 8*d* may be re-introduced into the fuel cell stack 8*d*. Also, or alternatively, an oxygen discharge device 34 may be provided at the discharge end of the fuel cell stack 8*d* for discharging air.

The controller 8*e* may comprise a valve controlled so that hydrogen may be supplied from the hydrogen storage tank 9 to the fuel cell stack 8*d*, and may control a flow rate of hydrogen flowing into the fuel cell stack 8*d*. Also, or alternatively, a hydrogen purging device 32, an air purging device 35, and/or the reaction water purging device 33 may be provided and/or configured so that residual hydrogen and reaction water can be discharged after reaction in the fuel cell stack 8*d*.

As such, the controller 8*e* may control the flow rate and humidity of the air introduced into the fuel cell stack 8*d* in response to a request for propulsion force from the aircraft, and may control the flow rate of hydrogen. Furthermore, the controller 8*e* may be configured to be able to control the flow rate of the air introduced through the inlet portion 8*a* in consideration of the altitude of the aircraft, the humidity and temperature of the introduced air, and the cruising speed of the aircraft as the outside air conditions of the aircraft.

Figure 4:
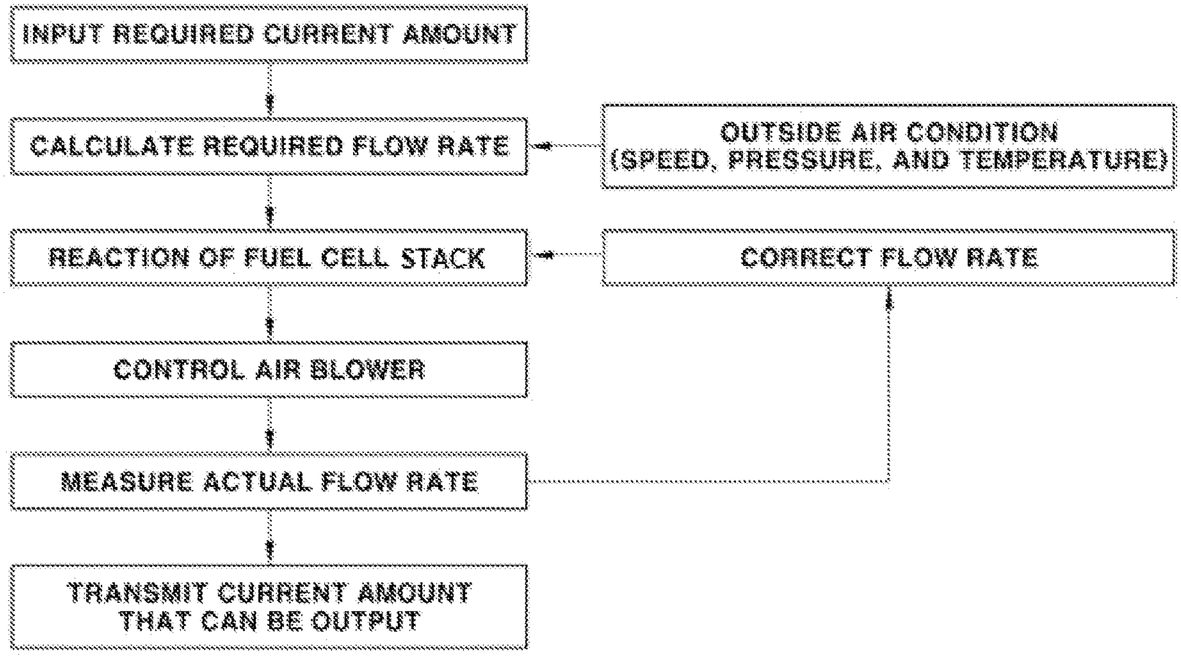
FIG. 4 shows a flow rate control loop of the fuel cell stack as an example of the present disclosure.

FIG. 4 shows a control step of controlling a flow rate of introduced air in response to an outdoor air condition as an example of the present disclosure.

The controller 8*e* may cause transmission of a current amount, based on a desired and/or target propulsion force of the aircraft, from the fuel cell system 8, and/or may calculate a flow rate of air to be provided through the inlet portion 8*a* accordingly (e.g., so as to cause generation of current in the current amount). The flow rate of air to be provided through the inlet portion 8*a* may be calculated in consideration of a speed of the aircraft, an outside air temperature of the aircraft, the density of air outside the aircraft, etc., as the outside air condition.

Then, the controller 8*e* may be configured to control the opening amount of the inlet portion 8*a* so that air of the desired and/or target flow rate may be introduced into the fuel cell system 8 through the inlet 8*a*, and/or may be configured to control the amount of driving of the blower 8*b* located at the rear end of the inlet portion 8*a*. The controller 8*e* may be configured to control the rotation amount of the blower 8*b* based on the outside air condition.

In one example of the present disclosure, the rate of rotation of the blower 8*b* may be controlled based on the density of air, and at a relatively high altitude measured through an altitude sensor (not shown) of the aircraft, the air density is relatively low, and thus the rate of rotation of the blower 8*b* is increased. That is, in the case of an altitude greater than a set value stored in the controller 8*e*, the rate of rotation of the blower 8*b* is controlled based on air density information according to the altitude sensor. The controller 8*e* may be configured to store a set value of the air density in response to the flight altitude of the aircraft, and to control the rate of rotation of the blower 8*b* based on the air density set in response to an actual altitude of the aircraft.

Also, or alternatively, the controller 8*e* may be configured to control the blower 8*b* based on the outside air temperature measured by a temperature sensor (not shown) of the aircraft. That is, when the measured outside air temperature is a relatively low temperature when compared to the temperature according to the altitude stored in the controller 8*e*, the rate of rotation of the blower 8*b* is increased. Conversely, when a relatively high temperature is measured when compared to the temperature according to the altitude stored in the controller 8*e*, the rate of rotation of the blower 8*b* is increased. The controller 8*e* may be configured to control the rotation amount of the blower 8*b* in response to a temperature difference actually measured based on an air density set value based on the altitude and temperature set in the controller 8*e*.

In this way, the controller 8*e* may be configured to control the rotation amount of the blower 8*b* based on altitude information of the aircraft and is additionally configured to compensate the rotation amount of the blower 8*b* based on the outside air information measured by the temperature sensor.

Moreover, the controller 8*e* may be configured to control the rotation amount of the blower 8*b* in response to the cruising speed of the aircraft. For example, the controller 8*e* performs a control operation to decrease the rate of rotation of the blower 8*b* when the aircraft cruising speed is relatively fast, and to increase the rate of rotation of the blower 8*b* when the aircraft cruising speed is relatively slow. The cruising speed of the aircraft is determined based on the set value stored in the controller 8*e*, and the set cruising speed and a current cruising speed of the aircraft may be compared to each other to control the blower 8*b* in response to a difference value therebetween.

As such, the controller 8*e* of the present disclosure may be configured to control the rate of rotation of the blower 8*b* in consideration of at least one of an altitude condition of the aircraft, the density of the outside air, the outside air temperature, or the cruising speed of the aircraft as an outside air condition.

As one example of the present disclosure, the controller 8*e* may be configured to determine the rate of rotation of the blower 8*b* set according to the altitude of the aircraft according to the outside air condition, and to correct the rate of rotation of the blower 8*b* to increase the rate of rotation when the outside air temperature increases or the speed of the aircraft becomes relatively low. Furthermore, the controller 8*e* may be configured to correct the rate of rotation of the blower 8*b* to decrease the rate of rotation when the outside air temperature becomes lower than the set value or the speed of the aircraft becomes relatively high.

Furthermore, the controller 8*e* may be configured to measure a flow rate of air actually introduced via a flow meter located at the rear end of the air blower 8*b*, and to correct a flow rate of air introduced from the outside through the inlet portion 8*a* when an additional flow rate may be required when compared to a requested air flow rate.

In this way, when a flow rate requested to obtain thrust from the controller 8*e* may be introduced, electrical energy may be produced from the fuel cell stack 8*d* of the fuel cell system 8, and the electrical energy may be transmitted to the nacelles 13, 14, 15, and 16.

Figure 5:
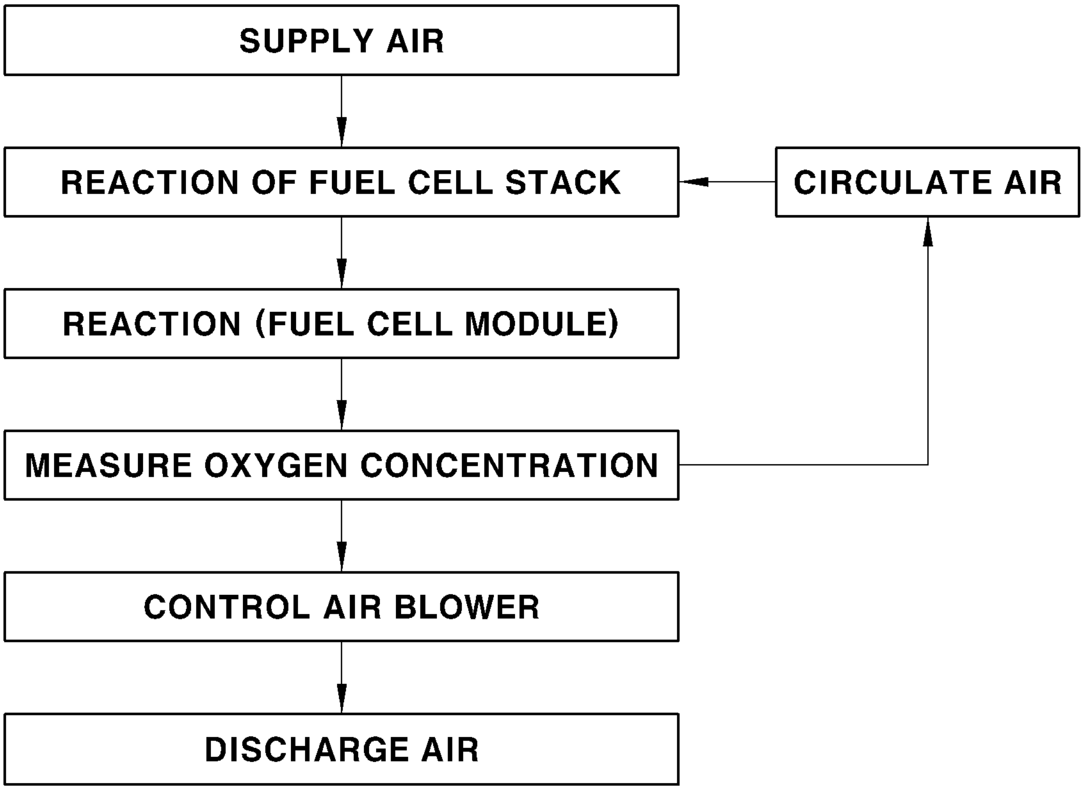
FIG. 5 shows an air recirculation loop of the fuel cell stack as an example of the present disclosure.

FIG. 5 shows a control step of the air recirculation loop 30 as an example of the present disclosure.

The air recirculation loop 30 comprises an air recirculation path formed between an inlet end through which air may be introduced into the fuel cell stack 8*d* and a discharge end through which air in the fuel cell stack 8*d* may be discharged, and may be configured so that the air recirculation path may be fluid-connected to the air purging device 35.

The controller 8*e* may be configured to measure oxygen concentration of air discharged after air may be supplied to the fuel cell stack 8*d*, and to control the driving amount of the recirculation blower 31 located in the air recirculation path so that exhaust air may be recirculated to an inlet of a fuel cell stat when the measured oxygen concentration may be equal to or higher than concentration set in the controller 8*e*.

Conversely, when the oxygen concentration of the exhaust air measured by the controller 8*e* may be less than the set value, dry air and water may be separated by a moisture separator and discharged to the outside of the aircraft fuselage 5.

That is, in this way, it may be possible to provide an effect of increasing reaction performance of the fuel cell stack 8*d* by recirculating used air according to the oxygen concentration of the air discharged from the fuel cell stack 8*d*.

Figure 6:
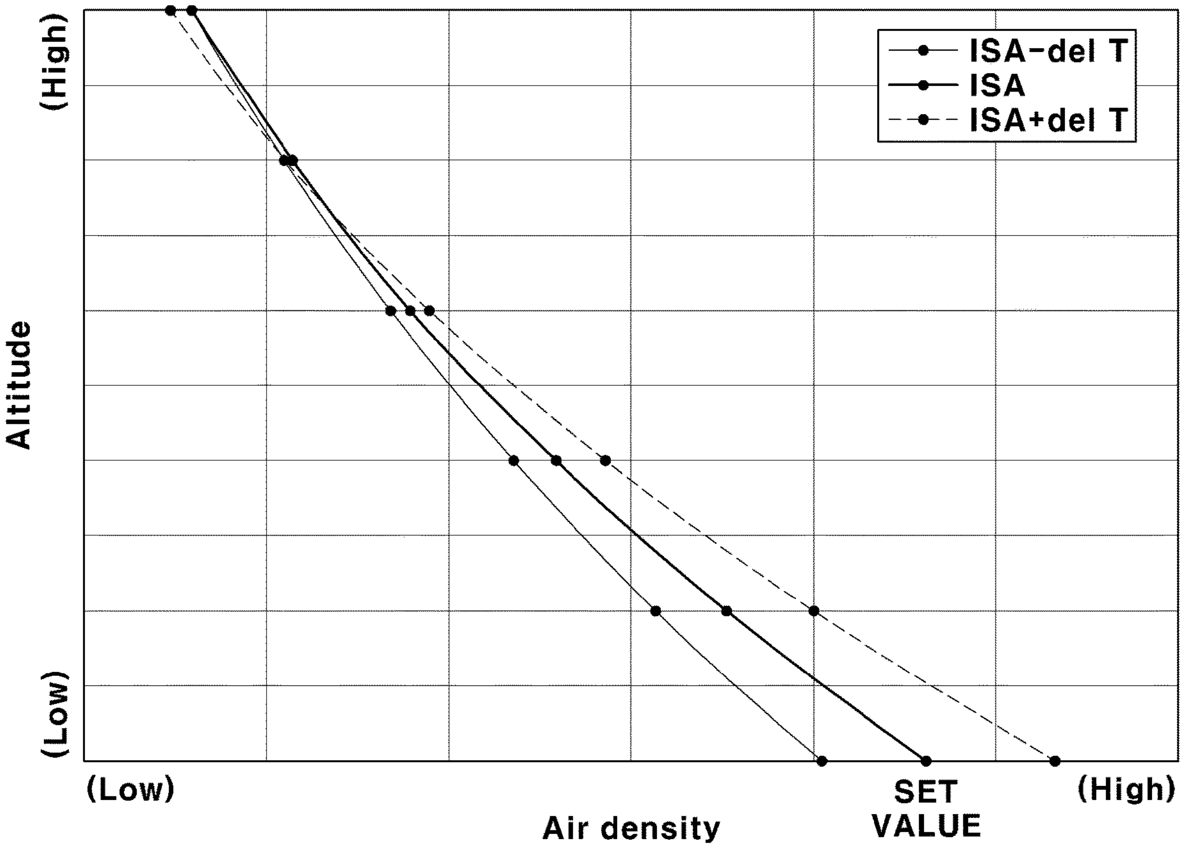
FIG. 6 shows a change in air density according to altitude and temperature change as an example of the present disclosure.
Figure 7:
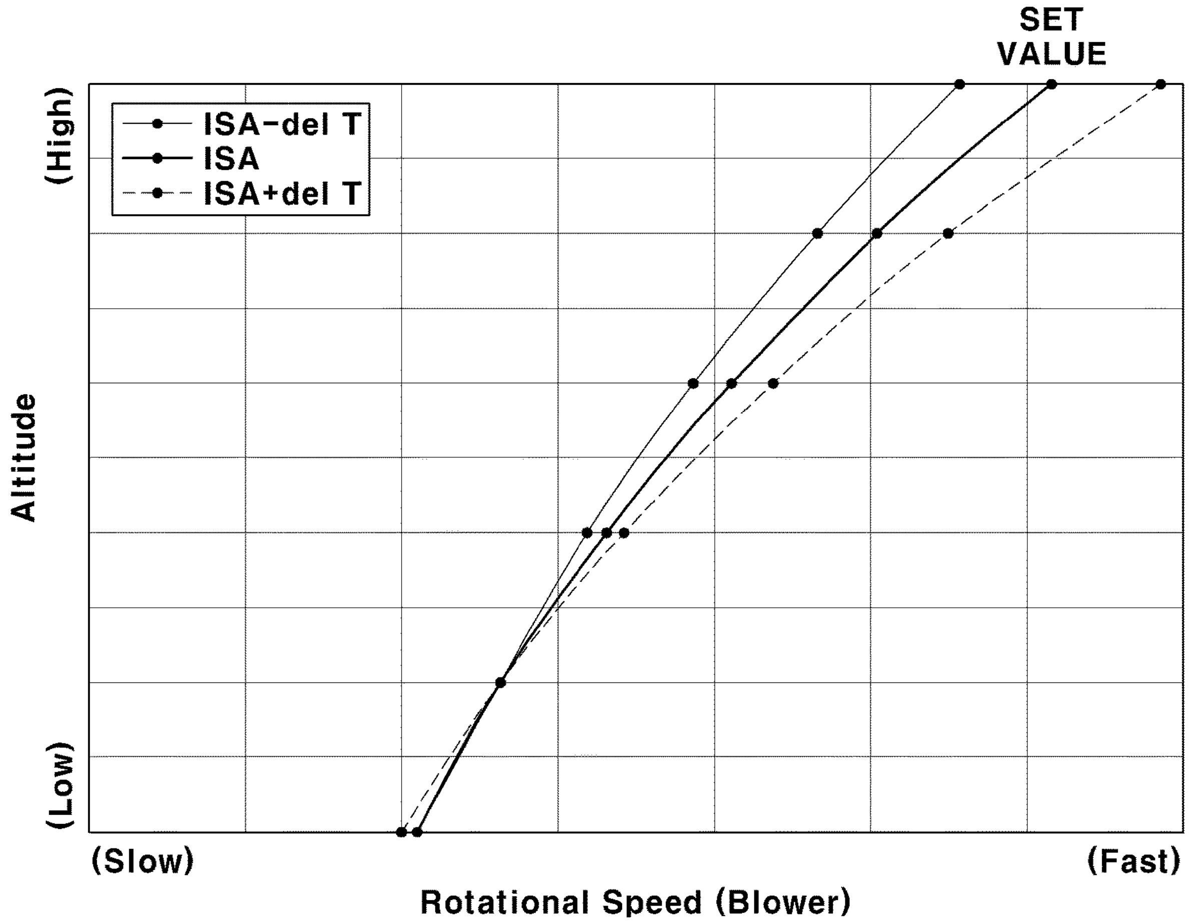
FIG. 7 shows a change in the rate of rotation of an air blower according to altitude and temperature change as an example of the present disclosure.

FIG. 6 shows a change in air density according to altitude as an example of the present disclosure, and further shows a change in air density at the same altitude according to temperature change. Also, or alternatively, FIG. 7 shows data for controlling the rotation amount of the blower 8*b* in response to a change in altitude and a change in outside air temperature.

As the flight altitude of the aircraft increases, the density of air may be reduced, and the controller 8*e* performs a control operation to increase a driving rotational speed of the blower 8*b* located at the rear end of the inlet portion 8*a* at low air density. Furthermore, the controller 8*e* may store the reduction amount of the air density according to the altitude of the aircraft, and control the rate of rotation of the blower 8*b* based thereon.

Moreover, the controller 8*e* may set the rate of rotation of the blower 8*b* according to the flight altitude of the aircraft, and correct the rate of rotation of the blower 8*b* in response to the outside air temperature measured through the temperature sensor. That is, as shown in the figure, when the temperature may be higher than a reference temperature set at the same altitude, the air density may be lowered, and the controller 8*e* corrects the driving amount of the blower 8*b* so that the rate of rotation may be higher than the set rate of rotation of the blower 8*b*.

Also, or alternatively, when the outside air of the aircraft has a temperature lower than a set reference temperature, the air density may be increased, and the controller 8*e* corrects the driving amount of the blower 8*b* so that the rate of rotation may be lower than the set rate of rotation of the blower 8*b*.

Figure 8:
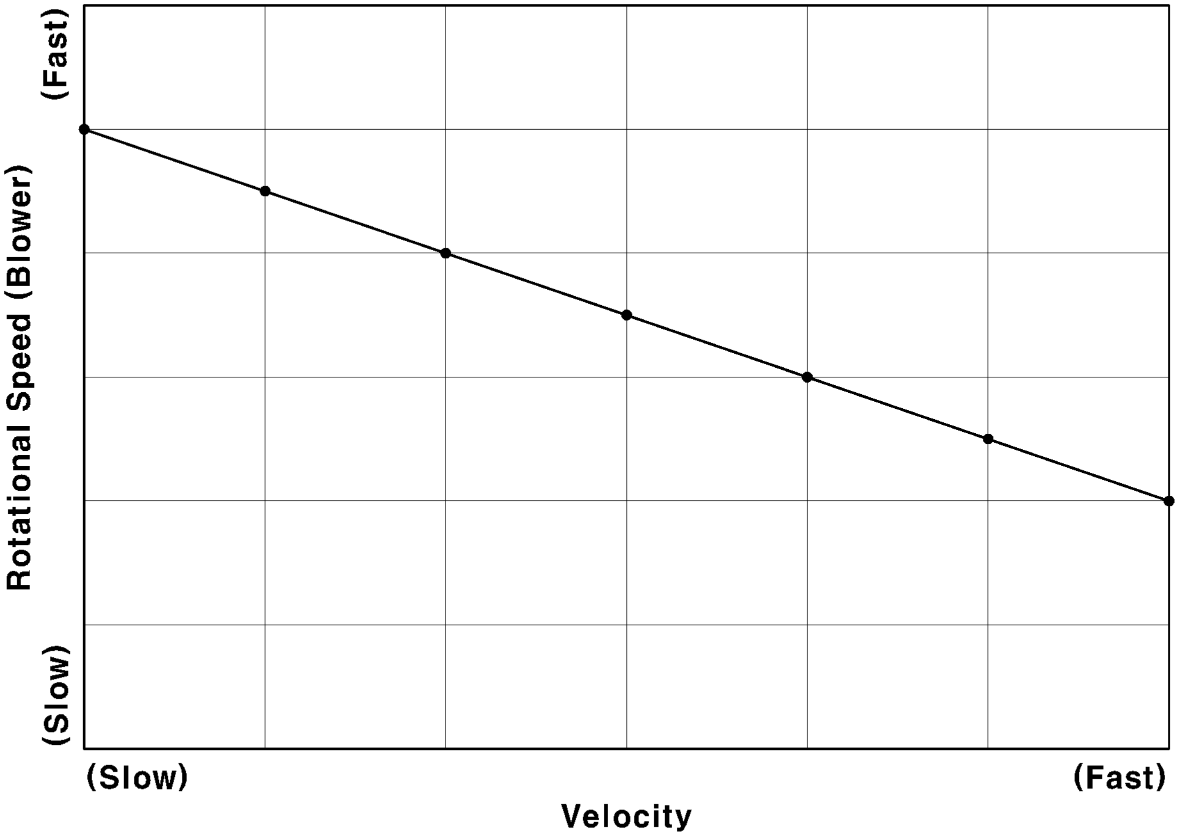
FIG. 8 shows a change in the rate of rotation of the air blower according to a flight speed change as an example of the present disclosure.

FIG. 8 shows a change in which the driving rotational speed of the blower 8*b* becomes smaller as the cruising speed of the aircraft increases.

The controller 8*e* may be configured to measure the cruising speed through a speed sensor of the aircraft, and to decrease the driving rotational speed of the blower 8*b* located at the rear end of the inlet portion 8*a* as the cruising speed increases above a set value in the controller 8*e*. That is, as the cruising speed increases, even when the blower 8*b* is not driven, the amount of air introduced through the inlet portion 8*a* increases compared to the relatively low cruising speed, and thus the driving force applied to the blower 8*b* may be reduced.

Also, or alternatively, the controller 8*e* performs a control operation so that, when the measured cruising speed of the aircraft is smaller than the set cruising speed, the driving force applied to the blower 8*b* may be increased to increase air introduced into the fuel cell stack 8*d*.

As such, the controller 8*e* of the present disclosure may be configured to control the flow rate of the air introduced into the fuel cell system 8 by performing correction to reduce the driving rotation speed of the blower 8*b* in response to the aircraft cruising speed.

Figure 9:
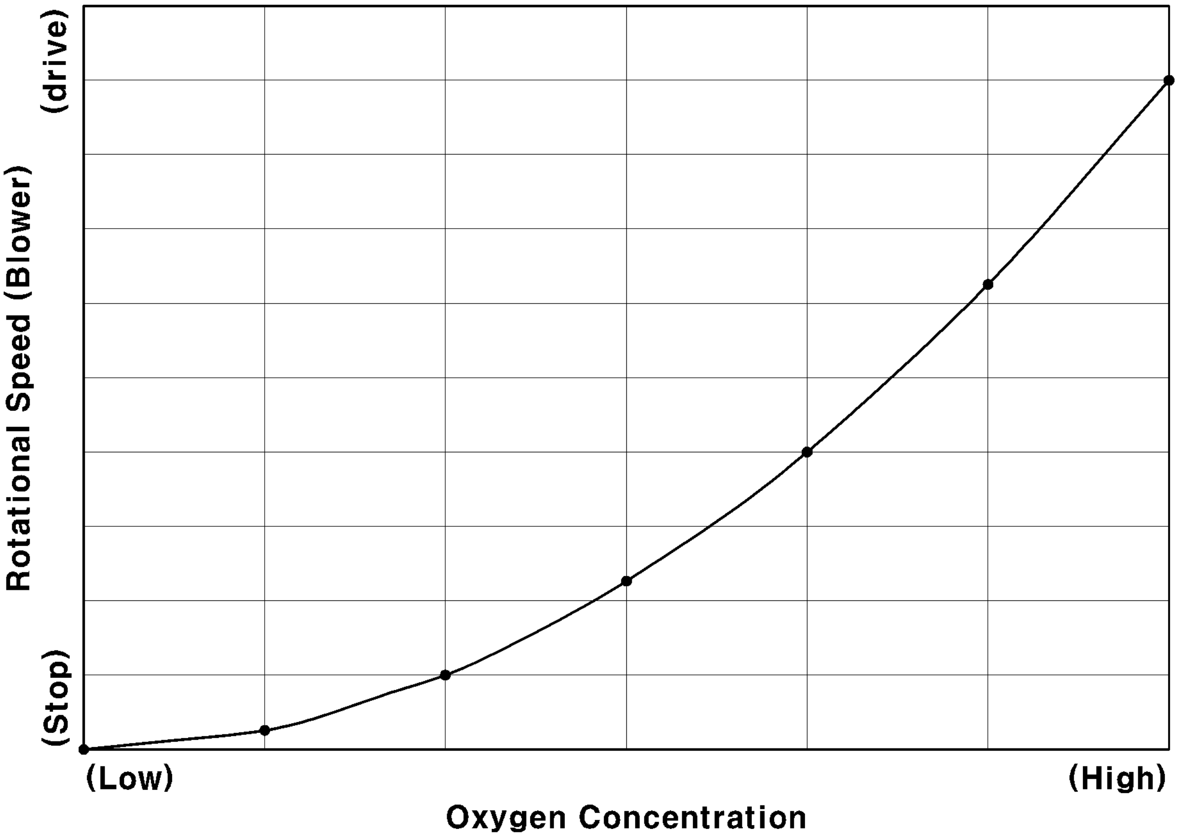
FIG. 9 shows a change in a rate of rotation of an air recirculation pump according to a change in oxygen concentration in the air as an example of the present disclosure.

Furthermore, FIG. 9 shows a driving change of the air recirculation loop 30 according to the oxygen concentration change.

When the oxygen concentration in the air at the discharge end of the fuel cell stack 8*d* is high, the rate of rotation of the recirculation blower (pump) located in the air recirculation loop 30 may be increased to increase a flow rate of air circulated to the inlet of the fuel cell stack 8*d* through the recirculation path.

In one example of the present disclosure, when the oxygen concentration in the air measured by the controller 8*e* is equal to or higher than the set value, the air introduced into the fuel cell system 8 through the inlet portion 8*a* moves from the inlet of the fuel cell stack 8*d* to an anode-side supply manifold of the fuel cell stack 8*d*, and flows back to the inlet of the fuel cell stack 8*d* along an intermediate circulation loop through an anode-side discharge manifold of the fuel cell stack 8*d*. Thereafter, the air discharged from the fuel cell stack 8*d* may be discharged to the outside of the aircraft body 5 through the discharge portion 8*g*.

As shown in the figure, when the oxygen concentration is higher than the set value set in the controller 8*e*, a control operation may be performed to increase the driving amount of the recirculation blower 31 located in the air recirculation path so that air flowing to the discharge end of the fuel cell stack 8*d* may be recirculated to the inlet end of the fuel cell stack 8*d*.

The present disclosure may obtain the following effects by the configuration, combination, and use relationship described above and the present example.

The present disclosure may provide longitudinal stability by providing an arrangement of the nacelle(s) and the fuel cell system inside the fuselage in consideration with a center of gravity of the aircraft.

Also, or alternatively, cooling and boiling-off of the hydrogen storage tank may be improved by the layout of the fuel cell system in the fuselage.

Moreover, there may be an effect of preventing deterioration of air aerodynamic characteristics through the aircraft in which the center of gravity may be located in the fuselage towards a front of the main wings of the aircraft.

Moreover, efficient operation of the fuel cell system may be performed by correcting the flow rate of air flowing into the fuel cell system according to the outside air condition.

The present disclosure provides an aircraft that generates electrical energy for driving a nacelle located on a main wing from a fuel cell system.

Another object of the present disclosure is to provide an aircraft equipped with a fuel cell system configured so that a center of gravity is formed at a set position of a fuselage by providing a layout of a plurality of nacelles for driving a propeller, the fuel cell system for supplying electrical energy to the nacelles, and a high-voltage battery.

Another object of the present disclosure is to provide an aircraft for controlling the amount of air flowing into a fuel cell system in response to an outside air condition of the aircraft.

The objects of the present disclosure may be not limited to the above-mentioned objects, and other objects of the present disclosure not mentioned may be understood by the following description, and may be seen more clearly by the examples of the present disclosure. Also, or alternatively, the objects of the present disclosure may be realized by means and combinations thereof indicated in the claims.

An aircraft equipped with a fuel cell for achieving the above objects of the present disclosure comprises the following configuration.

In one aspect, the present disclosure provides an aircraft equipped with a fuel cell system, the aircraft comprising a fuselage located in a front-rear direction, a front horizontal stabilizer located at a front end of the fuselage, main wings located to extend to both sides of a center of the fuselage, a rear horizontal stabilizer located at a rear end of the fuselage, the fuel cell system located adjacent to a rear of the fuselage with respect to the main wings, and configured to apply a driving force to a nacelle located on each of the main wings, and a controller configured to transmit electrical energy applied from the fuel cell system to the nacelle, in which a center of gravity of the aircraft is located in the fuselage close to front ends of the main wings, and a flow rate of air flowing into the fuel cell system is controlled in response to an outside air condition of the aircraft.

In an example, the fuel cell system may comprise an inlet portion configured to introduce outside air, a fuel cell stack fluid-connected to the inlet portion, an air recirculation loop formed between an inlet end and a discharge end of the fuel cell stack, and a hydrogen storage tank fluid-connected to the fuel cell stack.

In another example, the aircraft may further comprise a high-voltage battery located on each of the main wings and configured to transmit stored electrical energy to the nacelle, in which the controller may be configured to transmit electrical energy to the nacelle through the fuel cell system and the high-voltage battery.

In still another example, the aircraft may further comprise a blower located adjacent to the inlet portion, and a compressor located at a rear of the blower to compress air introduced through the inlet portion.

In yet another example, the inlet portion may be located adjacent to an upper end of the fuselage.

In still yet another example, the aircraft may further comprise a heat exchanger branching from the blower to heat at least a portion of air introduced through the inlet portion.

In a further example, at least one nacelle may be provided on each of the main wings located on both sides.

In another further example, the nacelle may comprise an EPU for transmitting electrical energy applied from the fuel cell system to a propeller.

In still another further example, the outside air condition may comprise at least one of an altitude of the aircraft, a temperature of introduced air, or a density of introduced air.

In yet another further example, the controller may be configured to determine a rate of rotation of a blower set according to the altitude of the aircraft according to the outside air condition, and to correct the rate of rotation of the blower to increase the rate of rotation so that a flow rate of air flowing into the fuel cell system increases when an outside air temperature increases or a speed of the aircraft becomes relatively low.

In still yet another further example, the controller may be configured to determine a rate of rotation of a blower set according to the altitude of the aircraft according to the outside air condition, and to correct the rate of rotation of the blower to decrease the rate of rotation so that a flow rate of air flowing into the fuel cell system increases when an outside air temperature decreases or a speed of the aircraft becomes relatively high.

In a still further example, the controller may be configured to drive the air recirculation loop when an oxygen concentration measured at the discharge end of the fuel cell stack is equal to or higher than a set value.

The above detailed description is illustrative of the present disclosure and describes examples of the present disclosure. The present disclosure may be used in various other combinations, modifications, and environments. That is, changes and/or modifications may be possible within the scope of the concept of the disclosure disclosed in this specification, the scope equivalent to the described disclosure, and/or within the scope of skill or knowledge in the art. The examples describe the best state for implementing the technical idea of the present disclosure, and various changes to adapt to specific application fields and uses of the present disclosure may be possible. Accordingly, the detailed description of the present disclosure is not intended to limit the present disclosure to the disclosed examples. In addition, the appended claims should be construed as comprising other examples.

What is claimed is:

1. An aircraft comprising:

a fuselage;

a first horizontal stabilizer located at a front end of the fuselage;

a second horizontal stabilizer located at a rear end of the fuselage;

main wings located to extend from opposite sides of the fuselage at a position between the front end and the rear end of the fuselage;

a plurality of batteries located on each of the main wings;

a fuel cell system configured to generate electrical energy and supply the electrical energy to an electrical motor configured to drive a propeller of the aircraft; and a controller configured to cause transmission of the electrical energy to the electrical motor, and to control a flow rate of air into the fuel cell system in response to a determined outside air condition of air outside the aircraft, wherein a center of gravity of the fuel cell system is located rear to the main wings, wherein a front portion of the fuel cell system is located forward of a rear end of the main wings, wherein a center of gravity of the aircraft is located at a location in the fuselage that is in line with front ends of the main wings, and wherein the front portion of the fuel cell system is further located at a center of the main wings and between the plurality of batteries such that the center of gravity of the aircraft is located at the location in the fuselage that is in line with the front ends of the main wings.

2. The aircraft of claim 1, wherein the fuel cell system comprises:

an inlet portion configured to cause outside air to be introduced to the fuel cell system;

a fuel cell stack connected to the inlet portion;

an air recirculation loop formed between the inlet portion and a discharge portion of the fuel cell stack, wherein the discharge portion is configured to cause air to be discharged from the fuel cell stack; and a hydrogen storage tank connected to the fuel cell stack.

3. The aircraft of claim 2, further comprising:

a high-voltage battery located on each of the main wings and configured to transmit stored electrical energy to the electrical motor, wherein the controller is configured to control transmission of electrical energy to the electrical motor via the fuel cell system or the high-voltage battery.

4. The aircraft of claim 2, further comprising:

a blower located adjacent to the inlet portion; and a compressor configured to compress air introduced through the inlet portion.

5. The aircraft of claim 2, wherein the inlet portion is positioned adjacent to an upper side of the fuselage.

6. The aircraft of claim 4, further comprising a heat exchanger configured to heat at least a portion of air introduced through the inlet portion.

7. The aircraft of claim 1, wherein at least one driving device is provided on each of the main wings.

8. The aircraft of claim 1, further comprising an auxiliary electric propulsion unit (EPU) configured to transmit the electrical energy generated by the fuel cell system to the electrical motor.

9. The aircraft of claim 1, wherein the determined outside air condition comprises at least one of an altitude of the aircraft, a temperature of the air outside the aircraft, or a density of the air outside the aircraft.

10. The aircraft of claim 1, wherein the controller is configured to determine, based on the determined outside air condition or a speed of the aircraft, a rate of rotation of a blower adjacent to an inlet portion of the fuel cell system.

11. The aircraft of claim 10, wherein the determined outside air condition comprises a temperature; and wherein the controller is configured to control the rate of rotation of the blower by:

based on a decrease in the temperature or an increase in the speed of the aircraft, decreasing the rate of rotation to decrease the flow rate of air flowing into the fuel cell system; or based on an increase in the temperature or a decrease in the speed of the aircraft, increasing the rate of rotation to increase the flow rate of air flowing into the fuel cell system.

12. The aircraft of claim 2, wherein the controller is configured to drive the air recirculation loop when an oxygen concentration measured at the discharge portion satisfies a threshold.

13. An aircraft comprising:

a fuselage;

a first horizontal stabilizer located at a front end of the fuselage;

a second horizontal stabilizer located at a rear end of the fuselage;

main wings located to extend from opposite sides of the fuselage at a position between the front end and the rear end of the fuselage;

a plurality of batteries located on each of the main wings;

a fuel cell system configured to generate electrical energy and supply the electrical energy to an electrical motor configured to drive a propeller of the aircraft; and a controller configured to cause transmission of the electrical energy to the electrical motor, and to control a flow rate of air into the fuel cell system in response to a determined outside air condition of air outside the aircraft, wherein a center of gravity of the fuel cell system is located rear to the main wings, wherein a front portion of the fuel cell system is located forward of a rear end of the main wings, wherein a center of gravity of the aircraft is located at a location in the fuselage that is in line with front ends of the main wings, wherein the front portion of the fuel cell system is further located at a center of the main wings and between the plurality of batteries such that the center of gravity of the aircraft is located at the location in the fuselage that is in line with the front ends of the main wings, and wherein the fuel cell system comprises:

an inlet portion configured to cause outside air to be introduced to the fuel cell system;

a blower located adjacent to the inlet portion;

a fuel cell stack connected to the inlet portion;

an air recirculation loop formed between the inlet portion and a discharge portion of the fuel cell stack, wherein the discharge portion is configured to cause air to be discharged from the fuel cell stack; and a hydrogen storage tank connected to the fuel cell stack.

14. The aircraft of claim 13, further comprising a compressor configured to compress air introduced through the inlet portion.

15. The aircraft of claim 13, wherein the determined outside air condition comprises at least one of a speed of the outside air relative to the fuel cell system, an altitude of the fuel cell system, a temperature of the outside air, or a density of the outside air.

16. The aircraft of claim 13, wherein the controller is configured to determine, based on the determined outside air condition, a rate of rotation of the blower.

17. The aircraft of claim 16, wherein the determined outside air condition comprises an outside air temperature or a speed of the outside air relative to the fuel cell system; and wherein the controller is configured to control the rate of rotation of the blower by:

based on a decrease in the outside air temperature or an increase in the speed of the outside air, decreasing the rate of rotation to decrease the flow rate of air flowing into the fuel cell system; or based on an increase in the outside air temperature or a decrease in the speed of the outside air, increasing the rate of rotation to increase the flow rate of air flowing into the fuel cell system.

18. The aircraft of claim 2, wherein the hydrogen storage tank is located rear to the fuel cell stack.

19. The aircraft of claim 13, wherein the hydrogen storage tank is located rear to the fuel cell stack.

* * * * *